3,259,508
METHOD OF DRYING BANANAS
Joaquin Aguirre, Carrera 18, 8570, Bogota 2, Colombia, Peter P. Noznick, 526 S. State St., Evanston, Ill., and Robert H. Bundus, 387 Thayer St., Riverside, Ill.
Filed Nov. 6, 1962, Ser. No. 235,787
15 Claims. (Cl. 99—204)

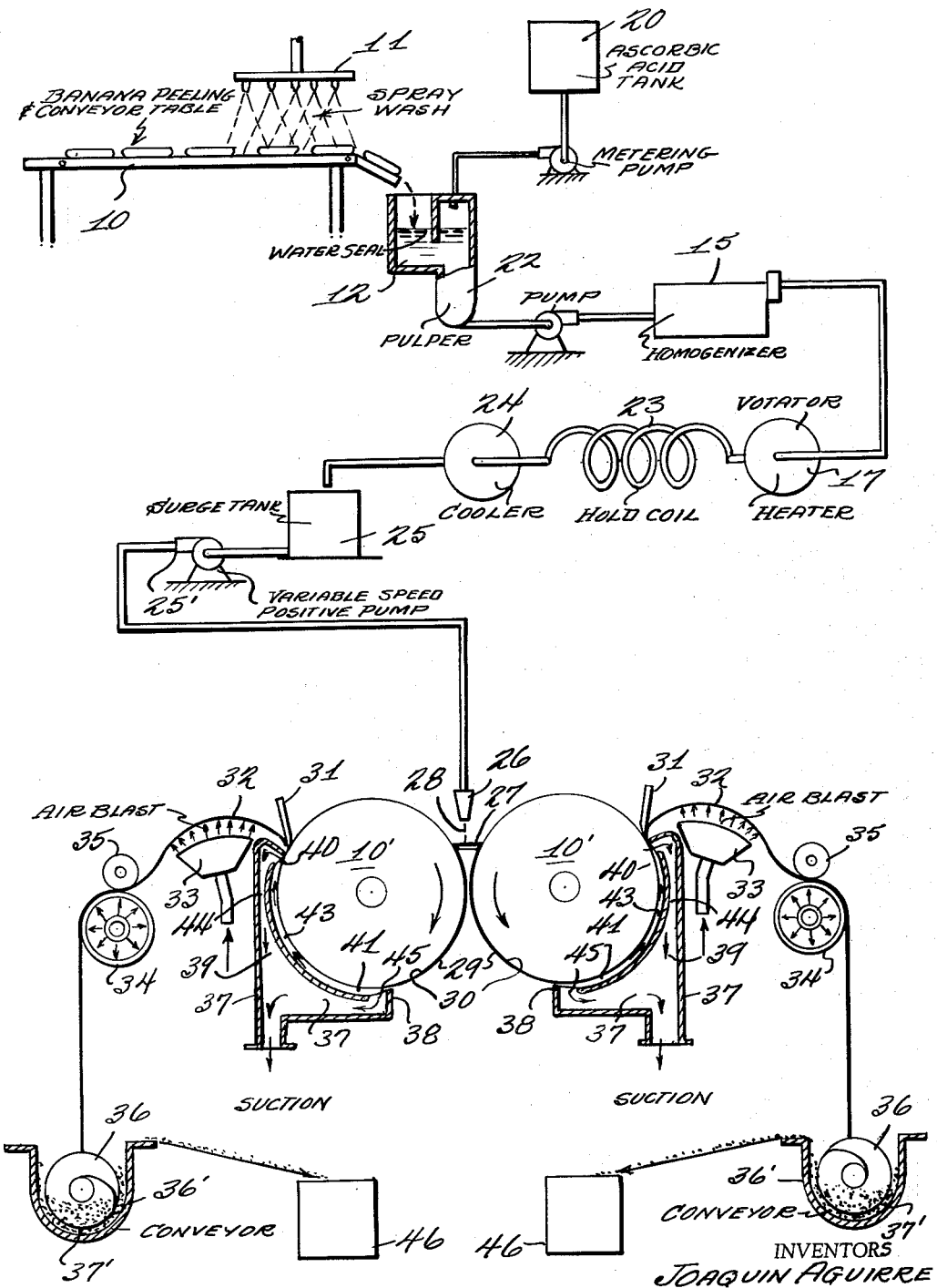

This invention relates to fruit powder, notably from raw, ripe bananas. It is equally useful in connection with other high sugar containing fruits having, for example, from 7 to 26% sugar on a liquid basis and either raw or processed in accordance with the invention, such as grapes, strawberries, guayaba, curuba, pineapple, as well as starch containing fruits having high sugar content, i.e., above 7% on a liquid basis, as stated. The raw fruits are usually initially heat processed in a conventional manner to destroy pathogenic bacteria and undesirable enzymes.

In carrying out the invention, reference is had to the accompanying drawing which will be used to illustrate the method of treating bananas by way of example, using a simple flow sheet.

The skins of the bananas are first removed by peeling as shown at 10 and the banana substance or meat is preferably washed at 11 with sprays of water which is free of contaminating influences, such as tap water, which may be tepid or hot or at the usual temperature of the tap. The temperature of the water is not significant. Then the raw banana meat is macerated at 12 on a high shear machine such as an extrusion plate provided with perforations through which the banana substance is pressed and whereby it is made pumpable without, however, altering the physical composition but reducing the banana flesh to a shapeless, pulpy mass.

The maceration step 12 is carried out in a closed chamber and preferably an inert gas, such as nitrogen, is introduced to the chamber under sufficient pressure to drive out and replace the air, thereby to permit maceration to be conducted in an inert atmosphere, i.e., of nitrogen. This preliminary step minimizes the creation of a slightly gray cast or other off-color in the final flake product and prevents any substantial development of off-flavors or odors which may subsequently, according to our observations, occur later in the production or in storage, although not immediately apparent. Other inert gases, such as carbon dioxide or mixture of carbon dioxide and traces of carbon monoxide, known as flue gas, derived from combustion of natural gas, propane, butane and other hydrocarbon gases, as well as rare gases such as argon and helium, are also useful to replace the air and produce the improved effects accompanying maceration in an inert atmosphere as just described.

Optionally, the macerated banana pulp or puree is stabilized against oxidation which often produces color changes. This is accomplished by addition of an antioxidant, notable, ascorbic acid, as shown at 20 preferably to the maceration operation 12. For example, about 0.15 to 0.50%, preferably 0.3%, ascorbic acid on a dry weight basis of the banana puree is added, i.e., at a level of 50 to 60 mg./lb., preferably about 200 mg./lb. (in another example, 400 mg./lb. was used of the banana puree). This introduction of the anti-oxidant is made complete by intimate mixing, usually in the pulper, to uniformly distribute the ascorbic acid in the puree. In the examples where we added to the puree 200 mg. and 400 mg., respectively, of ascorbic acid, the mixtures were preferably held at 20 to 40° F., generally at 25° F., for 5 to 45 seconds, as shown at 22, in the pulper—in these examples about 30 and 40 seconds, respectively—and then homogenized at 15, heated and agitated at 17. If desired, the oxidation-preventing ingredient, i.e., ascorbic acid, may be introduced prior to the homogenization, i.e., before or during maceration or immediately thereafter or after homogenization, but it is introduced always before the heating and agitation step 17.

Such a pulpy mass, with or without antioxidant, is now pumped in a closed conduit and subjected to a higher shear force in a homogenizer 15 from under 1000 to 3000 lbs. pressure (p.s.i.g.), preferably about 2000 lbs. and sufficient or effective to be active to break up the starch and fibrous material, i.e., disrupt the same and simultaneously coat and entrap the relatively small amount of oil or oil-like material present in the mass, to thereby form a puree in which the ratio of solids content to water (considered as a total of 4 parts) is about 3:1, i.e., the banana having about 25% solids and water being present as about 75%.

This homogenization is a critical step which we have found to be essential to the success of the process. In some cases it precedes the heating and agitation step shown at 17 and later to be described. In other cases it follows the heating and agitation step 17, and in some instances part of the heating and agitation is conducted before, and part after homogenizing. By homogenizing a uniform product is continuously obtained, i.e., the film or sheet formed by drying on a drum drier, as will be later described, is free of variation in thickness, is devoid of perforated areas, and the web does not tear while being removed (under tension as shown in the Cowgill Patent No. 2,140,788) from the drying drum or drums by pulling upon the film to withdraw it from the drying drum surface. Failure to homogenize ripe bananas results in inability to pull the sheet from the drier drum surface as just mentioned. In the absence of homogenization, an uneven film or sheet is obtained of nonuniform thickness, having objectionable holes and it easily tears upon removal from a drying drum under pulling tension, as shown in the Cowgill patent, all of which objections the present invention now avoids by the aforesaid homogenization step, and the heating step now to be described.

The homogenized puree optionally containing the antioxidant is conveyed from the macerator 12 by pumping in a closed conduit to the homogenizer 15 and then still in a closed conduit to the heating and agitating operation 17 and holding means 23 such as a coil. The material in some cases is heated by flowing in a conventional tubular type of heat exchanger, but preferably the heating and agitation is accomplished in equipment such as a "Votator-Swept Wall, Indirect Heater" 17 which is commercially obtainable from the Girdler Corporation of Louisville, Kentucky.

The "Votation" treatment is likewise conducted in an inert atmosphere as described above and, in fact, such inert atmosphere or freedom from air is maintained about the banana material beginning with the initial shear treatment at 12 in the macerator through this heating and agitation treatment 17, holding step 23, and cooling step 24. The heating and agitation, however conducted, bring the banana material up to a temperature in the range from 225° F. to 300° F. (preferably 255° F.) and it is held at the temperatures recited for 60 to 0.3 seconds (preferably 15 seconds) to control color, flavor and aroma as desired, and to accomplish thermal destruction of the bacteria and enzymes. In other examples, we held the temperature within the range recited for 18 and 20 seconds, respectively.

The invention is directed to the treatment of ripe fruit in which it is critical for the purposes of drying and obtaining dried banana flakes, to utilize the heating and homogenization steps referred to and in this respect it is to be distinguished from the patent to Cowgill, No. 2,140,788, December 20, 1938.

The raw banana contains about 19 to 24% sugar, depending on the degree of ripeness as determined by refractive index, and after the heating and agitation step, the sugar content appears to increase slightly.

The heat treatment locks the natural flavor into the product and avoids the development of a hay-like smell in the dehydrated flake. As stated, we consider this heat treatment, like the homogenization treatment, also to be critical, whether conducted before, after, or partly before and partly after homogenization. In this connection, the anti-oxidant is added at any point before the heat and agitation step 17 just described, and all of the operations which have previously been described from the mascerator to the cooling means 24 are conducted in an air-free atmosphere which is preferably an inert gas in accordance with the foregoing description.

At this point it should be explained that the pulpy mass is continuously travelled from the macerator 12 as by pumping from this pulper to the homogenizer 15, to the heater-agitator 17, the holder 23 and cooler 24, and always sealed from the atmosphere beginning with the macerator and in an inert atmosphere and from the cooler 24 the banana enters an open surge tank 25 from which it is delivered to one or more drying drums, preferably two, as will now be described.

The puree conveyed to the cooler 24 is cooled to 60° F. to 120° F., preferably 80° F. (in another example 75° F.), and introduced to the surge tank 25. It is then pumped through an elongated nozzle 26 having a number of small openings delivering the puree to the bight 27 between two rotating, high temperature rolls 10′ such as are found on a conventional top feed, double drum drier, and each having, for example, a diameter of about 2 feet. A heating time and temperature are employed to obtain the desired color, flavor, odor and bacterial and enzymatic destruction. The feed of puree to the drum drier is maintained relatively slow to prevent objectionable accumulations from building up between, i.e., in the bight 27 of the drums. There is used a forced feed 25′ to nozzle 26 which extends across the width of the rolls such as a pump associated with the surge tank 25 provided with flooded suction means to the pump but a positive displacement pump with variable speed drive is also used in some cases, and, in fact, any suitable flow control device has been useful to assure a continuous, steady, uniform feed and flow of a stream to the bight 27. The puree at this point is exposed to the air and is about 75% moisture and 25% solids.

The puree shown at 28 entering the bight 27 as a continuous stream or spray from the nozzle openings in the nozzle 26 is deposited on the rotating drums 10′ and is dried at a temperature and over a time period on the rotating drums which is found most desirable in the case of the particular pulp to produce the preferred color, odor and flavor. This control is established by film thickness, namely, through maintaining 0.01 to 0.18 inch, preferably 0.015 inch, clearance between the drums 10′ and by maintaining the r.p.m. of the drums within the range of 4 to 20 r.p.m. For instance, the drums preferably 4 seconds at 8 r.p.m. (in another example, 10 r.p.m. for 3.5 seconds), and the temperatures of the contact surfaces 30 of the drums is held between 280° F. and 350° F., preferably 300° F., by steam introduced to the rolls at an appropriate pressure, e.g., 90 p.s.i.g.. Material dried within the ranges just mentioned and under the preferred conditions recited is removed from the drum surfaces 30 by blades 31, such as conventional doctor blades. The hot, molten, plastic, glass-like, dried puree films 32 so scraped from the drum surfaces 30 tend to accumulate on the blades and the films are therefore removed from the blades and stretched to some extent through passing within a relatively cold, dry air blast from nozzles 33, the air having a temperature of 40° F. to 90° F., preferably 65° F. This air blast suspends and cools the continuously moving sheet or web 32 having a thickness approximately a fraction of the clearance between the rolls as above mentioned, namely 0.15 to 0.085 inch, preferably 0.008 inch. Thereby, the continuous films 32 have the sugars therein crystallized and the web itself is made brittle, but the molten web, as removed from the rolls, is smooth, free of perforations and discontinuous breaks, and does not tear under a pulling tension. The removal of the sheet is maintained at constant speed thereby preventing accumulation of hot, dry product at the blades and with cooling of the product instantly upon removal from the respective drums.

The speed of sheet removal is controlled by the drawing of the same between rotating, interiorly air cooled reels 34 and wheels 35 resting freely in suspended contact with the film on the reels. The reel surfaces are in some cases perforated to obtain roughness, or have lightly corrugated surfaces to grip the sheets between the reel surfaces and the surfaces of the wheels resting thereon to draw the sheet from the rolls under tension as in the Cowgill patent above referred to.

The brittlized sheets extruding from the reels 34 and contact wheels 35 fall into screw conveyors 36 which continuously remove the dried material from the drying area. In this latter travel or conveyor treatment the brittle sheet forms into particles of miscellaneous sizes and the final particulated material 37′ is thereafter further broken up or ground to any desired fineness or size for packaging. This banana powder, or other similarly treated fruits, is useful alone or in combination with other foods for human beings and in some instances for animals.

The material in its broken up or powder form is hygroscopic, has a stable, attractive, appetizing banana flavor or that characteristic of the fruit from which the product is made, is water- and milk-soluble for reconstitution into a liquid suspension, can be caramelized by greater time and temperature treatment than recited above, i.e., times and temperature simultaneously exceeding the conditions heretofore mentioned.

The drying characteristics of the products are suprisingly improved by employment of high shear treatment of the initially raw and skinned banana or other fruits and vegetables, i.e., by breaking up the cellular structure and fibers of the banana from which the skin has been removed during maceration, followed by the homogenization and then heat treatment, e.g., "Votation." The banana in addition to being instantly soluble in water or milk, possesses a light yellow color and a fresh banana flavor and aroma, and attains substantially the same viscosity as the original puree upon reconstitution with water or milk. This is true of other similarly processed fruits.

The powder is useful as a flavor and food in ice cream, milk shakes, baby foods, cream fills in puddings, custards, eclairs, icings and pie fillings, as well as cakes, breads, dietary foods, e.g., for those having colitis. In fact, the particles or powders are used in many other compatible products, notably wherever fresh fruits are useful, as in prepared baking mixes, dry cereals, candies, and constitutes of itself a most acceptable food.

It is important that water and moisture, generated as vapor and steam during drying, be constantly removed from the dehydration area and prevented from coming into contact with the dried films, sheets or particles at any time because of the hygroscopic character of the dried products. To assure this will always be done effectively, air ducts 37 are placed in the optimum locations, for instance, at 38 under each drum, to continuously and instantly withdraw by suction the steam as it is generated, and this suction also creates a flow of cooling air around the drums as shown by the arrows 39.

It will be noted that baffles 40 extend in arcuate spaced relation to the adjacent surfaces of the rolls from the air ducts 37 to adjacent the air blasts 33 and doctor blades 31. The air ducts 37 have a wall portion extending in spaced relation to the lower end of each baffle as shown at 41, and an upper portion spaced outwardly from the baffle terminating at the upper end of the baffle 40 adjacent the doctor blade 31 and air blast 33 as shown at 42. Thus, there is provided two passages 43, 44 communicating at their upper and lower ends, whereby steam generated at the surface of a roll is drawn upwardly as shown by the arrows in the inner passage 43 and adjacent the doctor blade 31, and air blast 33 is withdrawn into the outer passage 44 downwardly as shown by the arrows and out through the suction duct 37 of each roll. Similarly, vapor and steam generated at the lower ends of the baffles 40 are withdrawn by the suction as shown by arrows 45.

The baffles 40 placed between each drum and the cooling air suction ducts 37 isolate the films or webs from any possible contact with humid air or high humidity condition while they are travelling on the drums and until they are doctored off in the presence of the relatively cooler and drier air blasts 33 and for a time thereafter up until the particles or powders are collected from the screw conveyors 36 into the bins 46. From the bins the broken up products of varying sizes are packaged as desired.

In the drying drum treatment, the faster the rolls travel, i.e., 7 to 12 r.p.m., preferably 8 to 10 r.p.m., more or less, and the less time the product is exposed to the heat treatment on the drums, the more the product is improved, i.e., with the least exposure time, the product is exposed to the drum heat treatment the better so that it is best to have a high heat treatment for a short time rather than a long heat treatment at a lower temperature. Thus, where the temperature of the drum surfaces is relatively high, the r.p.m. is increased and vice versa, i.e., we increase the r.p.m. if the heating temperature of the surfaces of the drums is increased.

As explained, it is important that the material being treated not only be macerated as described, in the absence of air and in an inert atmosphere, but that this condition be maintained until after the puree has been heat treated and until just prior to the stream entering the bight 27 of the drums. Air is a problem as far as color, i.e, darkening or blackening, is concerned until the enzymes have been inactivated.

While we have described the heating and agitation as preferably being accomplished after homogenizing, this is sometimes done before homogenization as stated, and it is to be appreciated that the heating in any event is essential to keep the flavor, i.e., entrap the same and destroy enzymes to avoid darkening. Thus, the heating before or after homogenizing is essential to preserve color and flavor. The ascorbic acid also precludes objectionable coloring or darkening of the final particles or flakes. For example, the heating to, and holding at, for instance, 250° F. for 5 to 45 seconds, preferably 50 seconds, has as one successful example demonstrated to be of considerable value in producing a product of desirable color, aroma and flavor. The addition of ascorbic acid or other anti-oxidant avoids darkening and gives a greater time for the described treatment, as well as for storage without danger of darkening.

The maceration step as a preliminary treatment of the peeled bananas to form a puree also assures that the cellular structure of the bananas which to some extent determines the size of the final patricles or flakes, will be disrupted and broken up and the presence of the ascorbic acid or other agent precludes oxidation and darkening during such maceration and after the puree has been formed, as well as the later heating and agitation.

The amount of caramelization which is observable at the point of removal of the film from the drying drums is denoted by the elasticity of the film as it is scraped and withdrawn, i.e., like pulling candy or taffy, as in the Cowgill patent. This elasticity becomes progressively reduced as the film travels through air blast 33 and over the reels 34. As stated, the sheet brittilizes as it cools and becomes so fragile so that it fragmentizes in a screw conveyor in the trough 36'. As indicated, the heating in the heat exchanger or "Votator" preserves flavor and color in the final flake product.

While we have described two drums 10', it is to be understood that the invention is equally useful with but one drum.

We claim:

1. The method of producing an edible flake from bananas having a sugar content greater than 7% on a liquid basis comprising macerating the same to disrupt the cellular structure, homogenizing the resultant puree, at 1000 to 3000 p.s.i., heating at a temperature of 125 to 300° F. and agitating the puree, feeding the same to a drying drum while rotating the latter and forming a film on the drum surface, removing the film in the presence of a blast of air relatively cooler and drier than the surface of the drying drum and the air thereabout, suspending the film in said blast while reducing its temperature and propelling it over a rotating, cooling means whereby the film emerges from the latter as a brittle mass and readily particulates in the presence of agitation.

2. The method according to claim 1 wherein steam and water vapor generated during drying on said drum are constantly removed from the drying area.

3. The method according to claim 1 wherein the maceration and heating is carried out in the presence of an inert atmosphere for 60 to 0.3 seconds.

4. The method according to claim 1 wherein the heating and agitation treatment is carried out in the absence of air until the enzymes and bacteria in the bananas are inactivated for 60 to 0.3 seconds.

5. The method according to claim 1 wherein the heat treatment precedes the homogenization.

6. The method according to claim 1 wherein the heat treatment follows the homogenization.

7. The method according to claim 1 wherein the heat treatment takes place partly before and partly after homogenization.

8. The method according to claim 1 wherein an antioxidant is added before the heating and agitation treatment.

9. The method according to claim 1 wherein the raw bananas have 19 to 24% sugar.

10. The method according to claim 11 wherein the bananas are ripe.

11. A method according to claim 1 wherein the process including macerating to feeding the puree to the drum surface is conducted in an inert atmosphere and the raw bananas have 19 to 24% sugar.

12. The method of producing an edible flake from raw bananas having 19 to 24% sugar comprising macerating the bananas to disrupt the cellular structure, homogenizing the resulting puree at 1000 to 3000 p.s.i., heating the puree at a temperature of 225 to 300° F. to destroy enzymes, feeding the puree to a drying means and forming a film of the dried bananas on the drying means surface and removing the dried bananas.

13. The method according to claim 12 wherein the process is carried out in an inert atmosphere at least through the step of heating the puree, said homogenization being at a pressure of 2000 p.s.i.

14. The method of producing an edible flake from raw bananas having 19 to 24% sugar comprising macerating the bananas to disrupt the cellular structure, homogenizing the resulting puree at 1000 to 3000 p.s.i., heating and agitating the puree at a temperature of 225° F. to 3000° F., and a time from 60 seconds to 0.3 second to destroy enzymes, adding an anti-oxidant prior to the heating treatment, feeding the heated homogenized banana puree to a drying drum while rotating the latter and forming a film on the drum surface and removing the film from said surface.

15. A process according to claim 14 wherein the heating is at 255° F. and wherein said film is removed by a blast of gas relatively cooler and drier than the surface of the drying drum, suspending the film in said blast while reducing its temperature and propelling it over a rotating cooling means whereby the film emerges from the latter as a brittle mass and breaking up said brittle mass into particles.

References Cited by the Examiner
UNITED STATES PATENTS

| | | | |
|---|---|---|---|
| 1,908,489 | 5/1933 | Sartakoff | 99—204 |
| 2,123,134 | 7/1938 | Cowgill | 99—204 |
| 2,140,788 | 12/1938 | Cowgill | 99—199 |
| 2,155,453 | 4/1939 | Stuntz | 99—204 |
| 2,157,775 | 5/1939 | Smith | 34—34 |
| 2,353,333 | 7/1944 | Harris | 99—204 |
| 2,435,842 | 2/1948 | Northcutt et al. | 99—204 |
| 2,635,353 | 4/1953 | Hahn | 34—112 |

A. LOUIS MONACELL, *Primary Examiner.*

R. S. AULL, *Assistant Examiner.*